US012665452B2

(12) United States Patent
Schoone

(10) Patent No.: US 12,665,452 B2
(45) Date of Patent: Jun. 23, 2026

(54) ELECTRIC MOTOR, IN PARTICULAR FOR INSTALLATION IN A WHEEL BODY OF A MOTORCYCLE

(71) Applicant: David Schoone, Schortens (DE)

(72) Inventor: David Schoone, Schortens (DE)

( * ) Notice: Subject to any disclaimer, the term of this patent is extended or adjusted under 35 U.S.C. 154(b) by 254 days.

(21) Appl. No.: 18/710,310

(22) PCT Filed: Nov. 18, 2022

(86) PCT No.: PCT/EP2022/082413
§ 371 (c)(1),
(2) Date: May 15, 2024

(87) PCT Pub. No.: WO2023/089095
PCT Pub. Date: May 25, 2023

(65) Prior Publication Data
US 2025/0015649 A1 Jan. 9, 2025

(30) Foreign Application Priority Data
Nov. 19, 2021 (DE) ...................... 10 2021 130 345.1

(51) Int. Cl.
*H02K 1/20* (2006.01)
*H02K 1/2796* (2022.01)
*H02K 7/00* (2006.01)

(52) U.S. Cl.
CPC ............. *H02K 1/20* (2013.01); *H02K 1/2796* (2022.01); *H02K 7/003* (2013.01)

(58) Field of Classification Search
CPC .......... H02K 7/003; H02K 7/14; H02K 9/223; H02K 9/22; H02K 9/225; H02K 9/227;

H02K 3/28; H02K 3/46; H02K 3/26; H02K 1/20; H02K 1/2796; H02K 1/2798;
(Continued)

(56) References Cited

U.S. PATENT DOCUMENTS 5,945,759 A * 8/1999 Tanaka ...................... H02K 5/24
310/90
6,252,321 B1 * 6/2001 Fisher .................. H02K 5/1672
310/90
(Continued)

FOREIGN PATENT DOCUMENTS

CN 110611379 A 12/2019
CN 210898689 6/2020
(Continued)

*Primary Examiner* — Maged M Almawri
(74) *Attorney, Agent, or Firm* — Smartpat PLC

(57) ABSTRACT

An electric motor is particularly intended for installation within a wheel hub of a motorcycle. The electric motor is constructed in the manner of a double-sided axial flux electric machine and comprises a liquid-cooled stator and a two-sided rotor with permanent magnets arranged on both sides of the stator. The stator includes a cooling body that in a form-fitting manner accommodates the coils. The cooling body features a cooling core with a plurality of cooling fins, between which the coils are arranged and within which radial channels are formed. The radial channels are interconnected at the radially outer ends of the cooling fins. All radial channels terminate at the radially inner ends of the cooling fins into a distributor channel.

17 Claims, 14 Drawing Sheets

(58) Field of Classification Search
CPC ........ H02K 1/14; H02K 1/182; H02K 1/2793;
H02K 21/24
USPC ................................... 310/54, 58, 59, 64, 65
See application file for complete search history.

(56) References Cited

U.S. PATENT DOCUMENTS

| | | | | |
|---|---|---|---|---|
| RE37,844 E * | 9/2002 | Pullen | ...................... | H02K 3/47 |
| | | | | 310/58 |
| 7,652,406 B2 * | 1/2010 | Kim | ......................... | H02K 1/18 |
| | | | | 310/43 |
| 8,013,482 B2 * | 9/2011 | Kurokawa | ............ | H02K 9/197 |
| | | | | 310/58 |
| 8,330,309 B2 * | 12/2012 | Perret | ...................... | H02K 5/15 |
| | | | | 310/90 |
| 9,742,242 B2 * | 8/2017 | Watanabe | .............. | H02K 5/207 |
| 9,912,203 B2 * | 3/2018 | Lucchi | ................ | H02K 15/022 |
| 10,418,889 B2 * | 9/2019 | Thiele | ................... | H02K 21/24 |
| 10,541,591 B2 * | 1/2020 | Patterson | .............. | H02K 11/33 |
| 10,574,110 B2 * | 2/2020 | Long | ........................ | H02K 3/28 |
| 10,819,169 B2 * | 10/2020 | Ogawa | ................... | H02K 1/145 |
| 11,387,710 B2 * | 7/2022 | Vansompel | ............ | H02K 9/227 |
| 11,594,929 B2 * | 2/2023 | Yao | .......................... | H02K 3/28 |
| 11,804,763 B2 * | 10/2023 | Maruyama | ........... | H02K 1/2793 |
| 12,374,951 B2 * | 7/2025 | Hunstable | .............. | H02K 1/146 |
| 12,537,422 B1 * | 1/2026 | Wang | ....................... | H02K 9/19 |
| 2003/0011253 A1 * | 1/2003 | Kalsi | ........................ | H02K 1/20 |
| | | | | 310/58 |
| 2005/0035672 A1 * | 2/2005 | Ward | .................... | B60L 3/0061 |
| | | | | 310/156.37 |
| 2007/0040465 A1 * | 2/2007 | Al-Khayat | .............. | H02K 3/28 |
| | | | | 310/216.106 |
| 2011/0221287 A1 * | 9/2011 | Lucchi | ..................... | H02K 3/24 |
| | | | | 310/54 |
| 2011/0309726 A1 * | 12/2011 | Carpenter | .............. | H02K 21/24 |
| | | | | 310/75 R |
| 2011/0316381 A1 * | 12/2011 | Asano | .................... | H02K 1/182 |
| | | | | 310/216.045 |
| 2012/0086303 A1 * | 4/2012 | Hsu | ........................ | H02K 1/182 |
| | | | | 310/216.113 |
| 2013/0147291 A1 * | 6/2013 | Woolmer | .............. | H02K 15/02 |
| | | | | 310/58 |
| 2013/0270945 A1 * | 10/2013 | Ziegler | .................... | H02K 5/16 |
| | | | | 310/90 |
| 2014/0009009 A1 * | 1/2014 | Deguchi | ................ | H02K 11/40 |
| | | | | 310/43 |
| 2016/0211718 A1 * | 7/2016 | Lucchi | ...................... | H02K 9/19 |
| 2018/0212489 A1 * | 7/2018 | Schuler | .............. | H02K 1/2798 |
| 2019/0165634 A1 * | 5/2019 | Whaley | ................... | H02K 3/50 |
| 2019/0190349 A1 | 6/2019 | Ito et al. | | |
| 2019/0288584 A1 * | 9/2019 | Vansompel | ........... | H02K 9/227 |
| 2021/0194302 A1 | 6/2021 | Purchase et al. | | |
| 2022/0278579 A1 * | 9/2022 | Bossecker | .............. | H02K 1/182 |
| 2022/0368202 A1 * | 11/2022 | Bossecker | ............... | H02K 5/20 |
| 2023/0006485 A1 * | 1/2023 | Witt | ......................... | H02K 1/14 |
| 2023/0009136 A1 * | 1/2023 | Witt | ....................... | H02K 16/02 |
| 2023/0327531 A1 * | 10/2023 | Tangudu | ................ | H02K 1/182 |
| | | | | 310/66 |
| 2025/0079926 A1 * | 3/2025 | Hunstable | ................ | H02K 3/50 |
| 2025/0112528 A1 * | 4/2025 | Anvari | ................... | H02K 9/223 |
| 2025/0211037 A1 * | 6/2025 | Nakamura | ........... | H02K 1/2791 |

FOREIGN PATENT DOCUMENTS

| | | | | | |
|---|---|---|---|---|---|
| CN | 212412878 | | 1/2021 | | |
| CN | 212412878 U | * | 1/2021 | ............... | H02K 3/50 |
| DE | 1224825 B | | 9/1966 | | |
| JP | S6397727 A | | 4/1988 | | |
| KR | 20200097419 | | 8/2020 | | |
| WO | 2013001480 A2 | | 1/2013 | | |
| WO | 2019241765 A1 | | 12/2019 | | |

* cited by examiner

10

10

81

89

92

94

96

98

ELECTRIC MOTOR, IN PARTICULAR FOR INSTALLATION IN A WHEEL BODY OF A MOTORCYCLE

CROSS-REFERENCE TO RELATED APPLICATION

This application is a national stage application, filed under 35 U.S.C. § 371, of International Patent Application PCT/EP2022/082413, filed on Nov. 18, 2022, which claims the benefit of German Patent Application DE 10 2021 130 345.1, filed on Nov. 19, 2021.

TECHNICAL FIELD

The disclosure relates to an electric motor, particularly for the installation in a motorcycle wheel hub. Furthermore, the disclosure pertains to the design of the wheel hub and to a motorcycle.

BACKGROUND

Electric motors are increasingly replacing combustion engines in motorcycles. Typically, the electric motor is positioned between the wheels of the motorcycle. The rear wheel is then driven via e.g., a chain. Direct integration of an electric motor into the hub of a front wheel, especially from bicycles, is also known. However, such electric motors cannot readily be dimensioned to suit motorcycle propulsion. With higher power consumption of the electric motor, heat dissipation becomes a problem. Excessive heating reduces the motor's performance. This issue is particularly pronounced when the electric motor is intended for a motocross bike, which requires a high-performance powertrain.

From international patent application WO 2013/001480 A2, a railway wheel with a built-in electric motor is known. This known electric motor is of the type of a double-sided axial flux electric machine with a liquid-cooled stator comprising a plurality of coils and coil cores inserted into the coils, and with a two-sided rotor having permanent magnets arranged on both sides of the stator. The stator includes a cooling body accommodating the coils in a form-fitting manner with a plurality of radial channels arranged between the coils and two distributor channels. In this known electric motor, several parallel radial channels are flowed through in series, with a first radial channel and a last radial channel each connected to a distributor channel. The radial channels are formed in a body made of synthetic resin. The distributor channels are connected to coolant lines via radial holes running inside a one-piece continuous shaft.

SUMMARY

The present application provides a high-performance and efficient electric motor with a high power-to-weight ratio, high torque density, and sufficiently small installation width for installation in the wheel hub of a motorcycle.

In an electric motor, particularly for installation in a wheel hub of a motorcycle, of the type of a double-sided axial flux electric machine, with a liquid-cooled stator comprising a plurality of coils and coil cores inserted into the coils, and with a two-sided rotor having permanent magnets arranged on both sides of the stator, wherein the stator includes a cooling body that accommodates the coils in a form-fitting manner, the cooling body has a cooling core with a plurality of cooling fins between which the coils are arranged and in which radial channels are formed in pairs side by side, wherein the radial channels are connected to each other at the radially outer ends of the cooling fins, and all radial channels at the radially inner ends of the cooling fins open into one of the distributor channels.

The wheel hub accommodates the electric motor and is intended for installation in a motorcycle. The motorcycle has a rear wheel hub, in which the electric motor is installed. The motorcycle is particularly a motocross bike, which places special demands on the performance of its powertrain and therefore requires especially efficient cooling.

The invention enables the required efficient cooling in a confined space. The cooling fins are parallelly flowed through by the cooling fluid. The cooling fluid only has to travel a short distance from one distributor channel to the other, namely through only two radially aligned radial channels and their connection. This also allows for a particularly compact design of the stator with an optimised high quality coolant flow.

In particular, the cooling core has adjacent inlet and outlet sides in the axial direction, which are sequentially flowed through. The coolant thus flows from the inlet side to the outlet side and thus overall in the axial direction through the stator. It is particularly preferred that the radial channels in the cooling fins are formed in pairs adjacent to each other in the axial direction and comprise a left-sided radial channel arranged on a left side and a right-sided radial channel arranged on a right side, and that at the radially outer ends of the cooling fins, axial connection channels are formed through which the left-sided radial channels and the right-sided radial channels are connected in pairs. Either the left side is the inlet side and the right side is the outlet side, or vice versa.

In particular, the distributor channels are formed adjacent to each other in the axial direction, preferably symmetrical to each other, in the cooling core, wherein the distributor channels comprise a left-sided distributor channel arranged on a left side and a right-sided distributor channel arranged on a right side.

In a specific embodiment, exactly two distributor channels are provided. Furthermore, the distributor channels are preferably formed ring-shaped in the cooling core, and for each distributor channel in the cooling core, several radial connection channels, particularly exactly three radial connection channels, are formed for connecting the respective distributor channel to coolant lines of a coolant distributor. The radial connection channels each open equidistantly, particularly spaced at an angle of 120° from each other, on the respective distributor channel into the distributor channel. This allows for a largely uniform supply of the radial channels with coolant and thus cooling of the cooling fins. To ensure uniform distribution of the coolant, it is also advantageous that, according to an advantageous embodiment, the cooling body has a flow divider in front of each radial channel in the mouth area of the radial channel into the respective distributor channel.

The cooling body is preferably formed in multiple parts and has two cooling core covers, which lie against the axial sides of the cooling core. The distributor channels and the radial channels are recessed as grooves into the cooling core from the axial sides of the cooling core and covered by the cooling core covers. Furthermore, the cooling core is preferably made of aluminium. The grooves for the radial channels, the distributor channels and axial connection channels as well as the drilled holes for the connection channels can be easily introduced into the cooling core, namely by milling for the channels and drilling for the holes. Alternatively, the cooling body can also be manufactured by die casting.

In a particularly advantageous embodiment of the electric motor, the electric motor has a two-part shaft. In particular, the shaft has a left-sided shaft half and a right-sided shaft half. The two shaft halves, which are the main bodies of the shaft, are connected to each other, preferably at a distance from each other, by cylindrical shaft connectors forming a central part. This allows for coolant and electrical connections to be routed into the core of the stator with the shaft being mounted around the established connections.

The connecting wires and hoses are particularly preferred to be led out of the stator inside the shaft. For this purpose, it is preferably provided that the shaft halves have hollow bodies and that the electric motor has a left-sided shaft insert inserted into the left-sided shaft half for the axial passage of coolant through the left-sided shaft half and a right-sided shaft insert inserted into the right-sided shaft half for the passage of coolant through the right-sided shaft half.

The shaft halves of the two-part shaft preferably each have at least one cylindrical main section and an end section for connection to the shaft connectors, wherein the end section is radially enlarged compared to the main section. This allows the load on the connection of the shaft halves to be limited and bending of the axis due to more favourable leverage forces to be counteracted.

Furthermore, the shaft connectors are preferably arranged parallel to each other and at a distance from each other. This creates free spaces through which the coolant can be guided by coolant lines from the interior of the shaft into the cooling body and back into the shaft.

In an advantageous embodiment, the cooling body has retaining rings which enclose the coils, in particular the windings of the coils, towards the outside. The retaining rings particularly lie axially on the outside of the cooling core covers and are preferably, particularly on both sides, electrically insulated. For this purpose, the retaining rings are preferably coated with an insulating varnish. Advantageously, the retaining rings have fingers which extend radially inwards. The fingers are particularly provided with holding tabs, which protrude laterally in the plane of the retaining ring and can thus hold the coils.

In a particularly advantageous embodiment of the electric motor, the coil cores each consist of a bundle of wire sections arranged parallelly to the axis of the stator, i.e., of wire bundles. The length of the wire sections is particularly dimensioned according to the width of the coils in the axial direction of the stator. The wire sections are preferably electrically insulated from each other, particularly coated with an insulating varnish for this purpose.

The wire sections are preferably glued together using an adhesive or lacquer, especially baking varnish. This allows bundles of wires to be initially brought into the appropriate cross-sectional shape during the manufacturing of the coil cores, optimally filling the free interior space of the coil. For example, using a template, the bundles can be shaped into almost any desired cross-section. Especially through thermal activation, the wires are then bonded together. Optionally, this is done under pressure. By curing the adhesive or lacquer, strands of bundled wires with the desired cross-section are formed. The coil cores are subsequently cut from these strands to the required axial length.

The wires already have a grain orientation due to manufacturing. This grain orientation is retained in the coil cores made from these wires and provides the coil cores with optimal properties for the nearly one-dimensional flux desired in the axial flux machine.

In a further development of the coil cores, fine metallic powder, especially powder of the wire material, is mixed into the adhesive or lacquer for bonding the wires. As a result, this powder deposits in the gaps between the wires and provides an additional increase in the density and conductivity of the coil cores.

In a particularly preferred embodiment of the electric motor, the permanent magnets are arranged as Halbach arrays into magnet rings, with the magnetic flux density of the magnet rings being greater on their side facing the stator coils than on their side facing away from the coils. Due to the weakening of the magnetic field on the side facing away from the coils, the rotor disks can be relatively thin, allowing the mass of the rotor to be reduced, thus contributing to increasing the dynamics and torque density of the electric motor. In a variant based on this, the permanent magnets are segmented in the radial direction to reduce eddy currents.

Preferably, the rotor forms a housing that consists of rotor disks, bearing housings and a rotor sleeve, which enclose the stator and seal it against the environment up to the shaft via rotor bearings. The stator is thus protected from external environmental influences.

In a particularly advantageous embodiment, the electric motor's rotor has bearing bodies projecting axially relative to the other parts of the rotor, especially relative to the outward rotor disks that bear the permanent magnets of the rotor, for supporting a wheel on its shaft, especially via spokes, bypassing all parts of the rotor except the bearing bodies and bearings themselves. Rotor bearings, especially in the form of ball bearings, are received in these bearing bodies. The bearing bodies are mounted on the shaft by means of the rotor bearings. The installation of the electric motor with the axially projecting bearing bodies in the wheel of a motorcycle is possible, especially due to the axially narrow design of the rotor and stator. The forces acting from the tire and rim via the bearings and e.g. spokes, onto the shaft advantageously act near the shafts support on the frame or swingarm of the motorcycle. Furthermore, the rotor disks bearing the permanent magnets are bolted to the bearing bodies and supported on the shaft via the bearing bodies. Thanks to the bolting, different materials can be connected, with the bearing bodies preferably made of aluminium and the rotor disks made of steel.

In a variant based on this embodiment of the electric motor, additional bearings, especially ball bearings, are integrated into the bearing bodies, which alone or together with the rotor bearings absorb the forces acting on the bearing bodies by means of the spokes. This further improves the introduction of forces into the shaft near the frame supporting the shaft.

An electric motor with a two-part shaft, an electric motor with bearing bodies for supporting a wheel on its shaft, coil cores made of bundles of wire sections, and a method for manufacturing the coil core can also be provided independently of the coolant flow through the cooling body and are therefore disclosed below as further solutions to the problem mentioned at the outset.

In an electric motor, particularly for installation in a wheel hub of a motorcycle, with a liquid-cooled stator comprising a plurality of coils and coil cores inserted into the coils and a cooling body that accommodates the coils in a form-fitting manner and with a rotor having permanent magnets, the electric motor has a two-part shaft with a left-sided shaft half and a right-sided shaft half, that the shaft halves are connected to each other at a distance by means of shaft connectors, and that the stator is connected to coolant lines guided through at least one of the shaft halves and in between the shaft connectors.

In an electric motor, particularly for installation in a wheel hub of a motorcycle and particularly of the type of a double-sided axial flux electric machine, the electric motor has bearing bodies projecting axially relative to its rotor, especially relative to rotor disks of the rotor, for supporting a wheel on its shaft bypassing the rotor, wherein rotor bearings are received in the bearing bodies, wherein the bearing bodies are mounted on the shaft by means of the rotor bearings, and wherein the rotor is bolted to the bearing bodies and supported on the shaft via the bearing bodies and bearings.

In a coil core for a coil of an electric motor, especially for a coil of an electric motor built according to the principle of an axial flux machine, the coil core consists of a bundle of insulated wire sections arranged parallel to each other and bonded together.

In a manufacturing method for the production of a coil core, wires insulated by a varnish are aligned parallel to each other according to a given cross-section, bundled, and bonded together to form a strand, and segments are cut from the strand by severing the wires bonded together from the strand so that the segments consist of a bundle of wire sections arranged parallel to each other and bonded together, forming the coil core with the desired cross-section.

Overall, the disclosure provides a novel electric motor based on the axial flux principle with a new mechanical structure of the rotor and stator, especially with an advantageous cooling concept, and with a novel structure of the shaft and coil cores of the stator. In addition, a novel manufacturing process for producing the coil cores is disclosed. The electric motor can be used universally but is particularly suitable for installation in a rear wheel of a motocross bike or other high-performance motorcycle due to the unique mechanical design allowing for efficient cooling and thus high torque density and an advantageous power-to-weight ratio.

DETAILED DESCRIPTION

Figure 1:
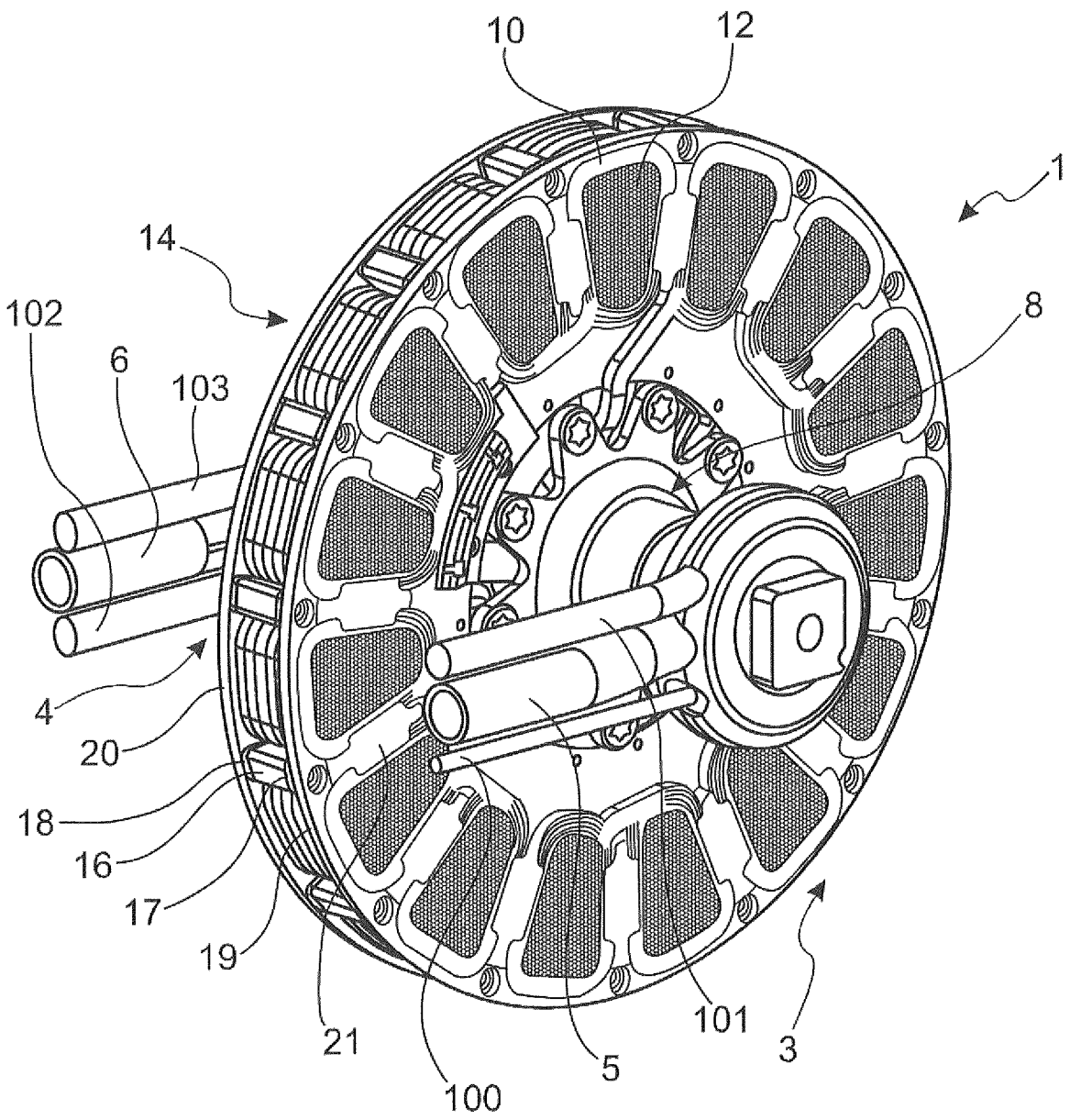
FIG. 1: a partial view of an electric motor for installation in the wheel hub of a motorcycle without showing the rotor in perspective view.

FIG. 1 shows a stator 1 for an electric motor. The electric motor is particularly intended for installation in a wheel hub of a motorcycle. Alternatively, the electric motor can also replace other electric motors, especially when high torque and high cooling performance are required. For this purpose, the stator 1 has a left-side coolant line 5 on its left side 3 and a right-side coolant line 6 on its right side 4. The stator 1 has a fixed shaft 8 through which the coolant lines 5 and 6, together with a sensor line 100, a first phase line 101, a second phase line 102, and a third phase line 103, are guided into the centre of the stator 1.

Figure 2:
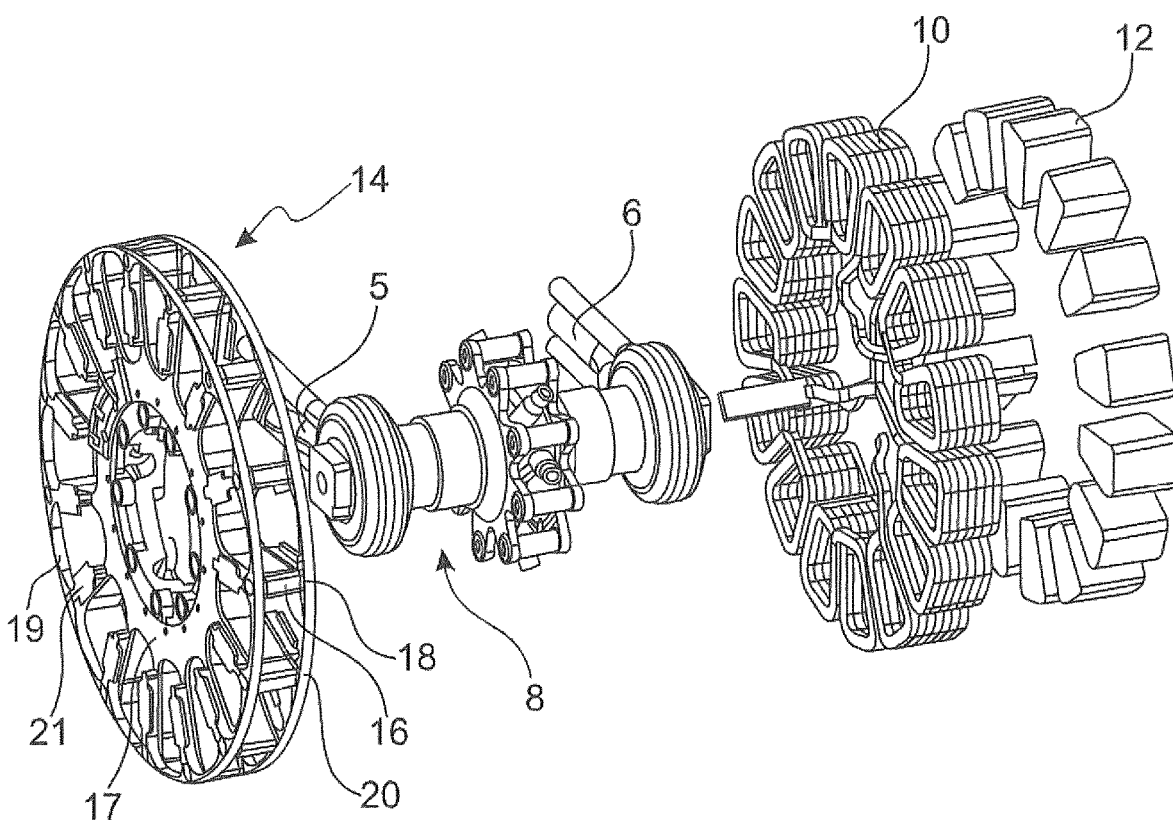
FIG. 2: the parts of the electric motor shown in FIG. 1 in an exploded view.

The stator 1 has a plurality of coils 10 with coil cores 12 arranged therein, only one of which being designated for reasons of clarity. There are 15 coils 10 provided. These are fitted in a cooling body 14 of the stator 1 in a form-fitting manner as shown in FIG. 2. For this purpose, the cooling body 14 on one side and the coils 10 with the coil cores 12 on the other side are adapted to each other in shape. In addition to ensure a secure hold, the coil cores 12 are glued to the coils 10 and the coils 10 are glued to the cooling body 14. The cooling body 14 is flowed through by a coolant to cool the coils 10 which ensures high power output and torque-density of the electric motor.

The cooling body 14 is formed in several parts to allow for easy production and ideal coolant flow and consists of a cooling core 16, which is formed, for example, from aluminium, a left-side cooling core cover 17 arranged on the left side 3, a right-side cooling core cover 18 arranged on the right side 4, a left-side retaining ring 19 arranged on the left side 3, and a right-side retaining ring 20 arranged on the right side 4. The cooling core 16 and the cooling core covers 17 and 18 are glued firmly with the coils 10. The cooling core covers 17 and 18 close the cooling channels arranged in the cooling core 16 to the outside, creating enclosed cooling channels. The retaining rings 19 and 20 are electrically insulated towards the cooling core covers 17 and 18 and placed on the cooling core covers 17 and 18. The retaining rings 19 and 20 enclose the windings of the coils 10 and thus ensure a secure hold of the coils 10 and the coil cores 12 as well as increase heat transfer area. For this purpose, the retaining rings 19 and 20 have fingers provided with retaining tabs, which embed the windings from the outside and increase contact area. A retaining tab of the retaining ring 19 is exemplarily designated by the reference numeral 21.

FIG. 2 shows an exploded view of the stator 1 of FIG. 1. In it, the cooling body 14, the shaft 8 with the coolant lines 5 and 6, the coils 10, and the coil cores 12 are shown separately. The coil cores 12 have a trapezoidal cross-section and are formed from bundles of wire sections glued together.

Figure 3:
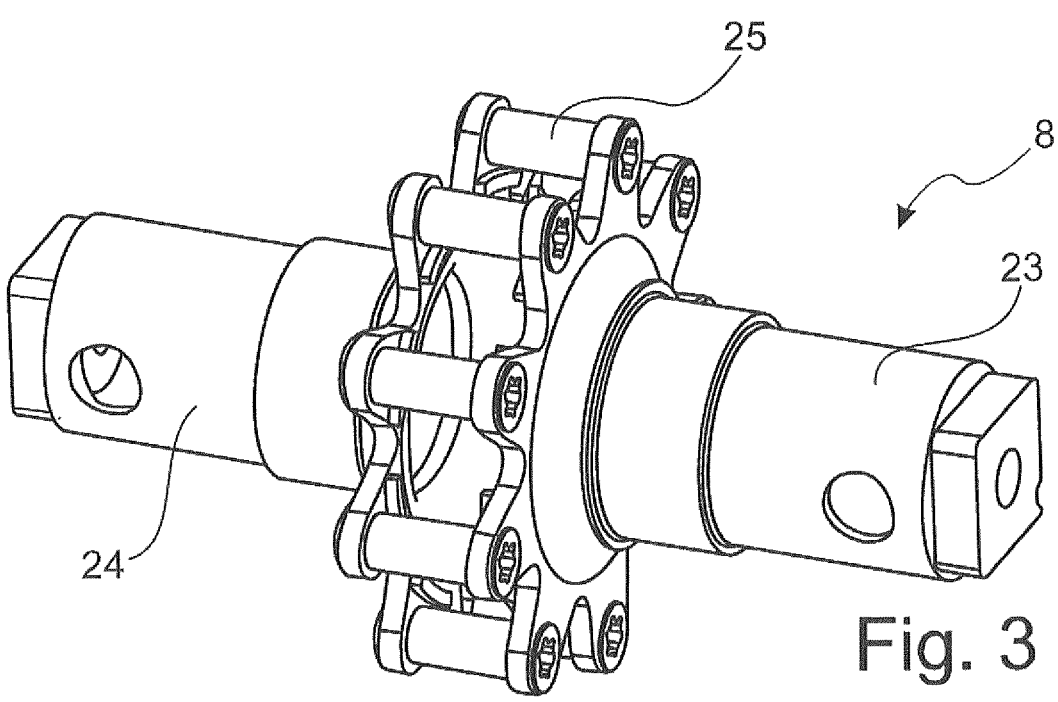
FIG. 3: a shaft of the electric motor in perspective view.

FIG. 3 shows the shaft 8 from FIGS. 1 and 2 in an enlarged view. Identical reference numerals designate the same parts in all figures. The shaft 8 is divided into multiple parts and has two main parts, namely a left-side shaft half 23 and a right-side shaft half 24. Furthermore, a plurality of shaft connectors 25 are provided, which connect the shaft halves 23 and 24 to each other at a distance. The shaft halves 23 and 24 are connected by bolting to the shaft connectors 25. The construction of the shaft 8 with the two shaft halves 23 and 24 is helpful for connecting the coolant lines 5 and 6 to the cooling core 16 during assembly of the electric motor and enables an optimised coolant flow.

Figure 4:
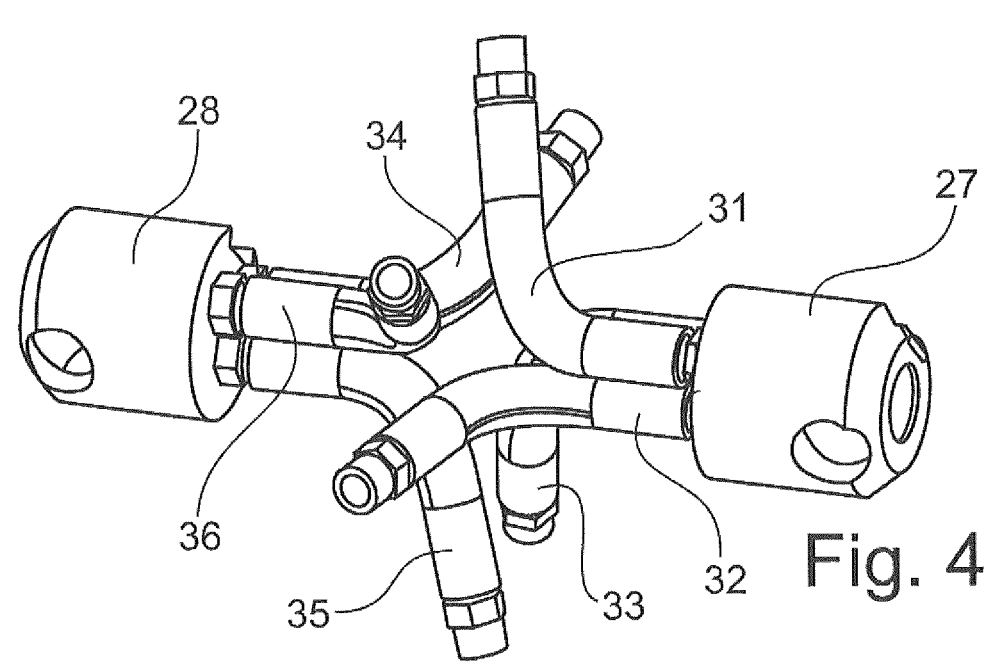
FIG. 4: shaft inserts of the electric motor for insertion into the shaft of FIG. 3 with coolant lines connected to the shaft inserts in perspective view.

FIG. 4 shows a left-side shaft insert 27 for insertion into the left-side shaft half 23 and a right-side shaft insert 28 for insertion into the right-side shaft half 24. The shaft inserts 27 and 28 serve to distribute coolant between the coolant lines 5 and respectively 6 and the cooling core 16. For this purpose, the left-side shaft insert 27 is connected to the cooling core 16 via three left-side inner coolant lines 31, 32, and 33. The right-side shaft insert 28 is connected to the cooling core 16 via right-side inner coolant lines 34, 35, and 36. All inner coolant lines 31 to 36 form the coolant distributor 110.

Figure 5:
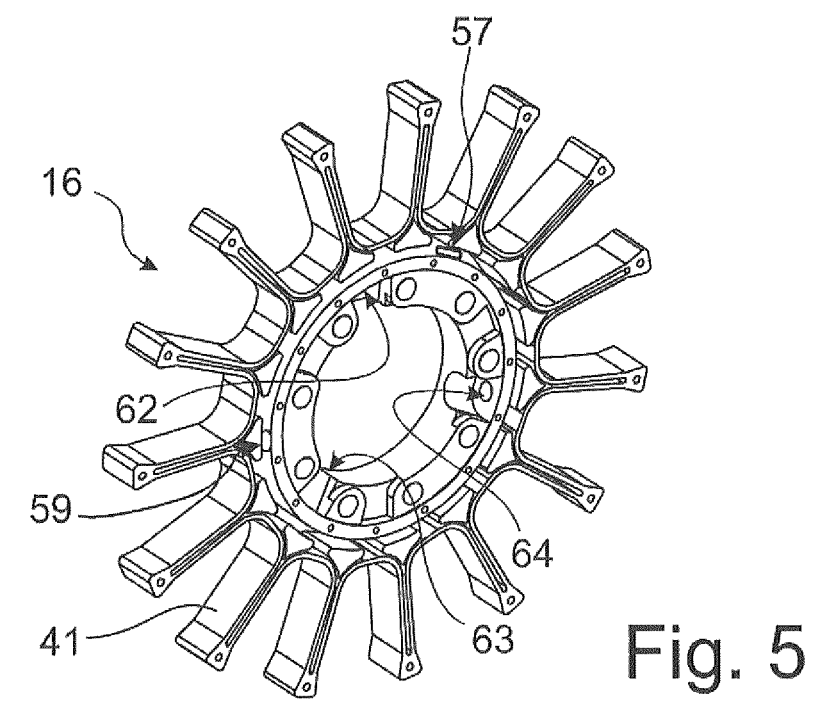
FIG. 5: a cooling core of a cooling body of the electric motor in perspective view.
Figure 6:
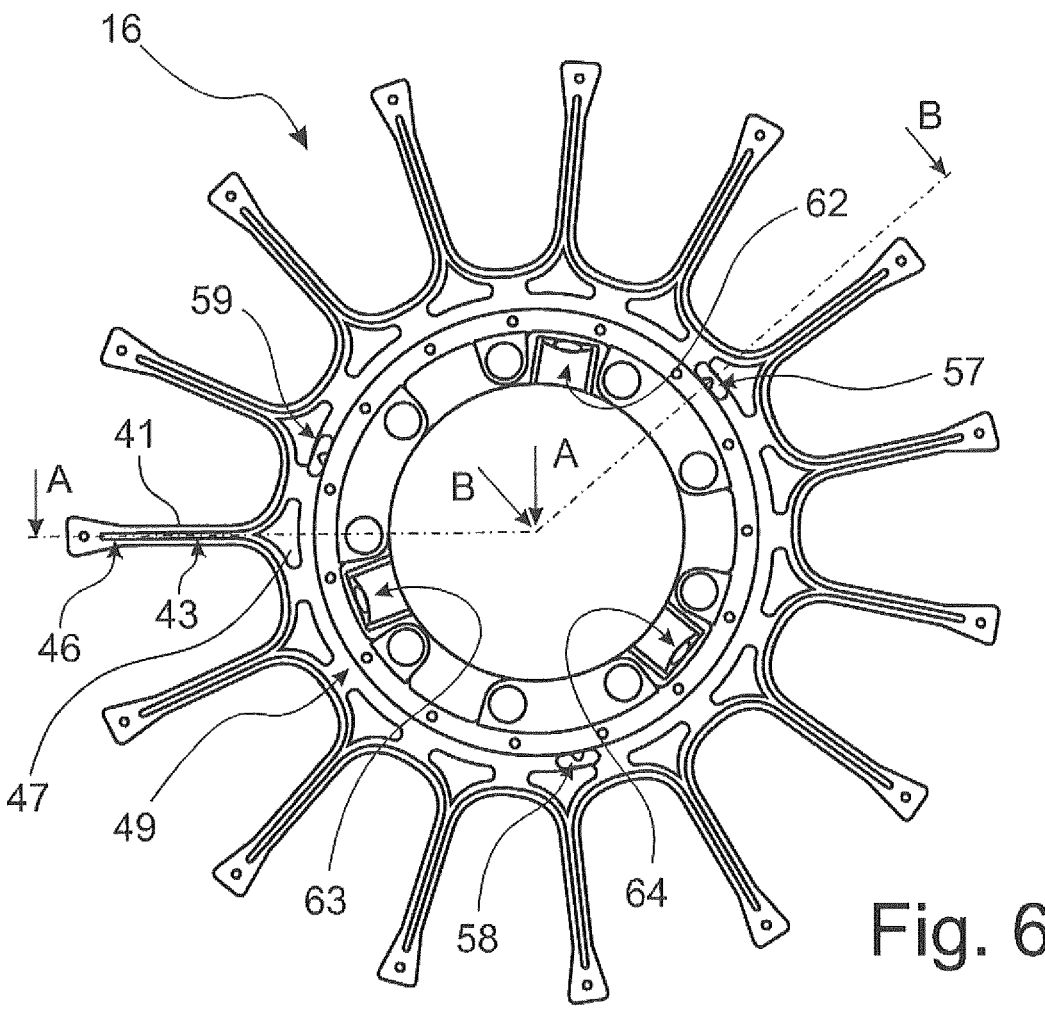
FIG. 6: the cooling core of FIG. 5 in a side view.

FIGS. 5 and 6 show the cooling core 16 in an enlarged view.

Figure 7:
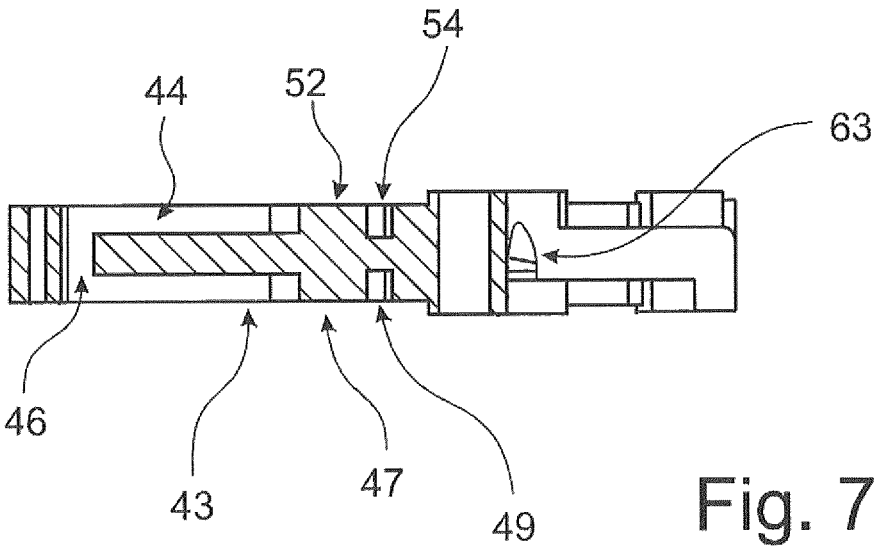
FIG. 7: a sectional view through the cooling core according to FIGS. 5 and 6 along line A-A in FIG. 6.
Figure 8:
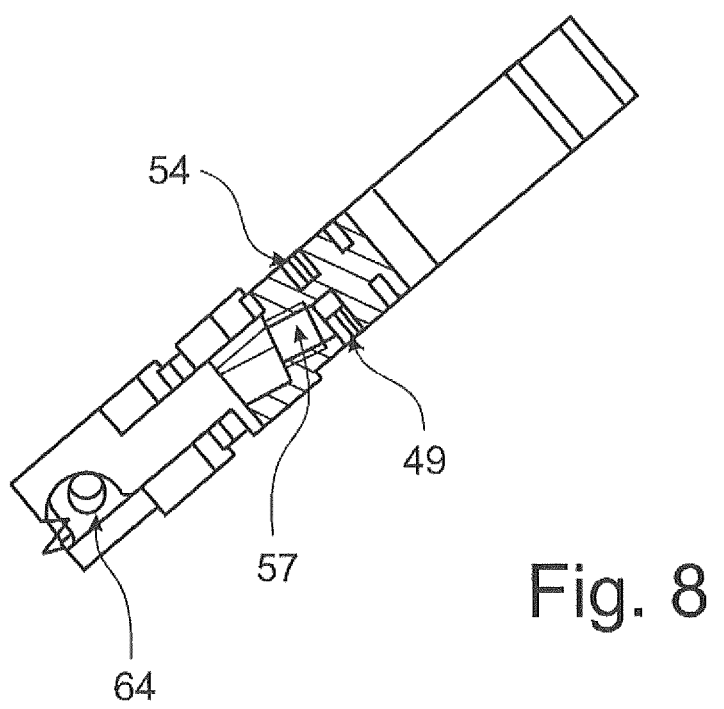
FIG. 8: a sectional view through the cooling core according to FIGS. 5 and 6 along line B-B in FIG. 6.

FIGS. 7 and 8 show the sectional views A-A and B-B from FIG. 6 for better illustration. The cooling core 16 has 15 cooling fins 41 extending radially outward. Each cooling fin 41 has a left-side radial channel 43 on the left side 3 and a right-side radial channel 44 on the right side 4. An end connection between the radial channels 43 and 44 is established via an axial channel 46 at the radial outer end of each fin. The left side 3 serves as an inlet side, while the right side 4 serves as an outlet side for the coolant. Consequently, the coolant flows radially outward in the left radial channel 43, then through the axial channel 46 from the left side 3 to the right side 4, and thereafter radially inward through the right radial channel 44 back toward the shaft 8. Alternatively, the right side 4 serves as the inlet side, and the left side 3 serves as the outlet side, causing the coolant to flow in the opposite direction through the cooling body 14.

The left radial channel 43 terminates in a ring-shaped left distributor channel 49 in the vicinity of a left flow divider 47. The right radial channel 44 terminates in a right distributor channel 54 in the vicinity of a right flow divider 52. The cooling core 16 includes on its right side 4 three right connection channels 57, 58, and 59 to connect the left distributor channel 49 with the right inner coolant lines 34, 35, and 36. Additionally, on the opposite, meaning the left side 3 and offset by 40° from the right connection channels 57, 58, and 59, the cooling core 16 features three left connection channels 62, 63, and 64, which connect the right distributor channel 54 with the left inner coolant lines 31, 32, and 33. The connection channels 57, 58, 59, 62, 63, and 64 are each slightly inclined relative to the radial direction, simplifying their manufacture through drilling from outside the cooling core 16. Consequently, the coolant flows either from the right side of the electric motor through the shaft 8 to the left toward the stator 1, then through the cooling core 16 from left to right, and finally through the shaft 8 to the left side of the electric motor, or in precisely the opposite direction if flow is reversed.

Figure 9:
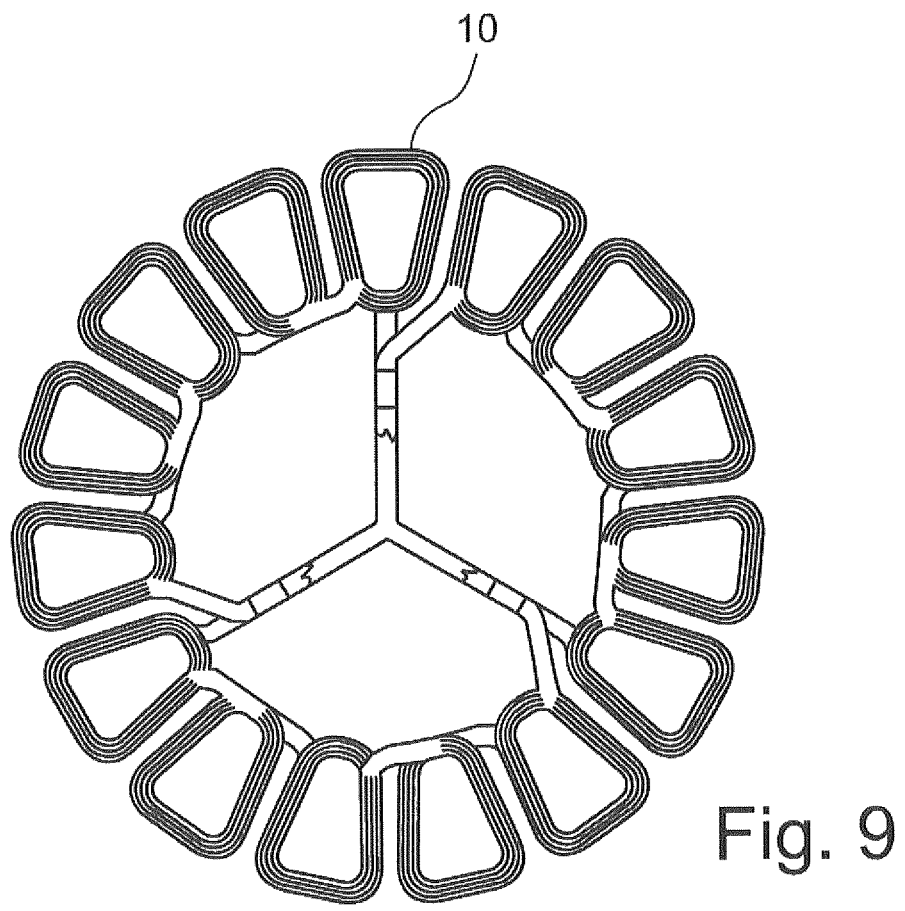
FIG. 9: a winding layout of the stator of the electric motor in a side view.
Figure 10:
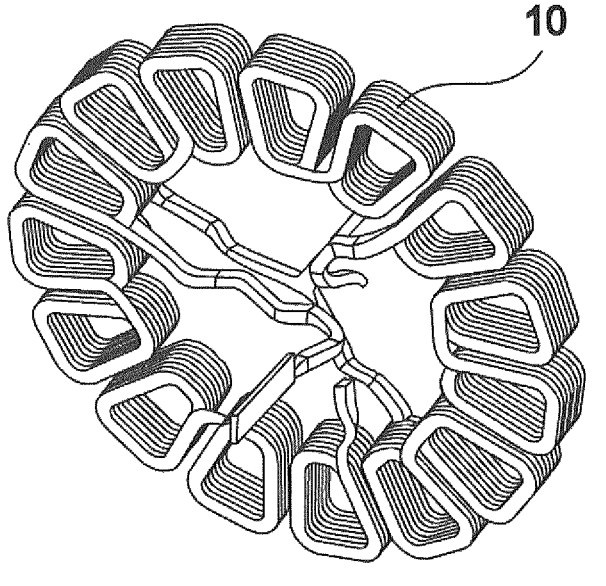
FIG. 10: the winding layout of FIG. 9 in perspective view.

FIGS. 9 and 10 illustrate the winding scheme and wiring of the coils 10. Five coils 10 are connected in series to form each phase. In total, there are 15 coils 10 and thus 15 poles present. Simultaneously, two phases are always driven, allowing ten poles to exert their magnetic force. The five coils 10 connected in series to form a phase are wound alternately clockwise and counterclockwise. Each phase comprises three coils 10 wound clockwise and two coils 10 wound counterclockwise.

Figure 11:
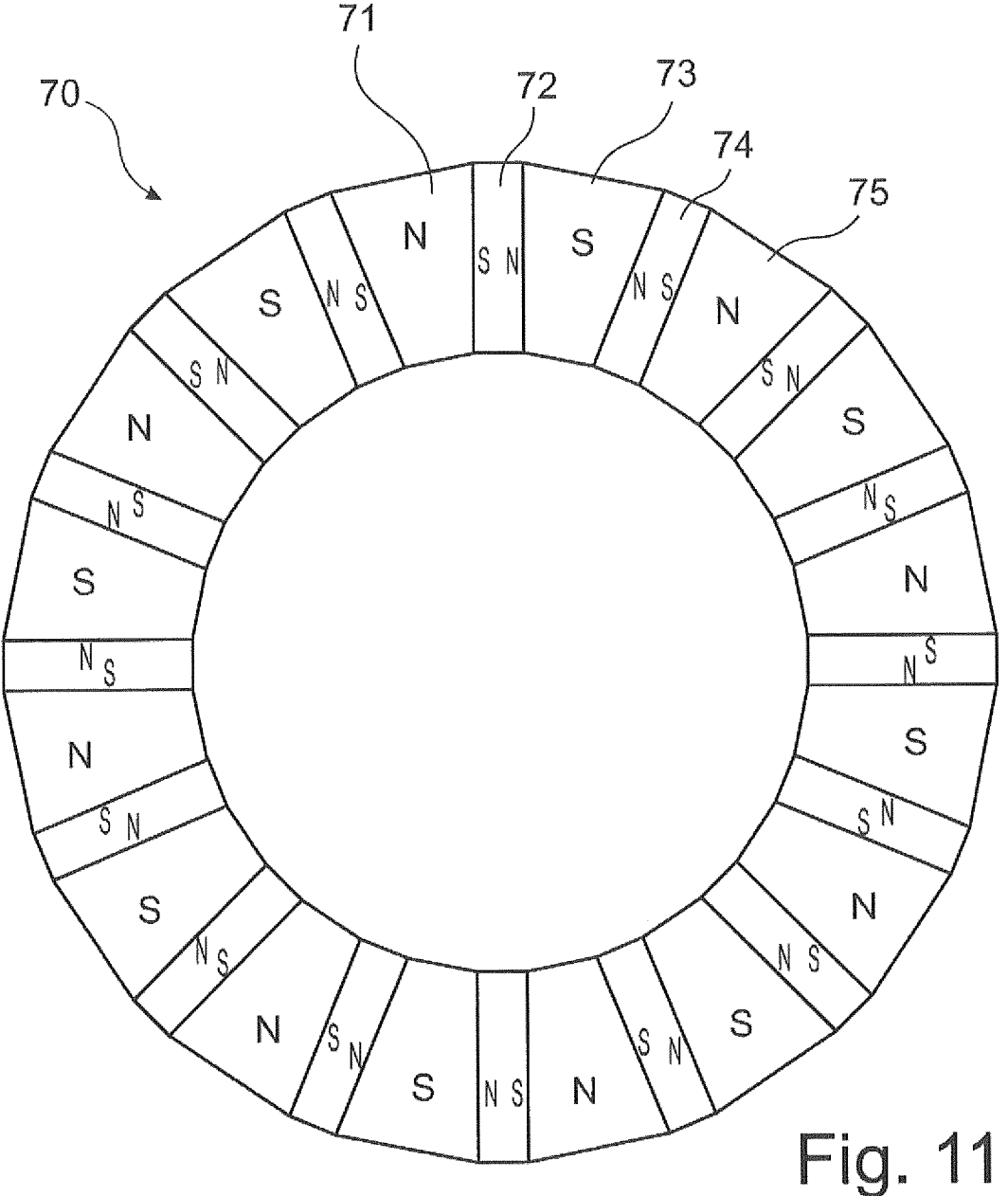
FIG. 11: a magnet ring for the rotor of the electric motor in a schematic side view.

FIG. 11 shows a magnet ring 70 comprising a plurality of permanent magnets 71, 72, 73, 74, and 75, as well as additional permanent magnets in a repetitive pattern not designated here, arranged in a configuration as a sixteen-pole Halbach array. The permanent magnets 71, 73, and 75 are arranged with their flux vectors aligned with the motor axis and in alternating orientations. The intermediate permanent magnets 72 and 74, however, are magnetically aligned in the plane of the magnet ring 70 and have their poles facing towards the respective adjacent permanent magnets 71 and 73, or 73 and 75. For example, the south pole of permanent magnet 72 on the front side of magnet ring 70 faces the north pole of permanent magnet 71, whereas the south pole of permanent magnet 72 on the rear side of magnet ring 70 faces the south pole of permanent magnet 71. The north poles of the magnets are indicated in FIG. 11 by the letter N, and the south poles are marked with the letter S. Overall, the arrangement of permanent magnets 71 to 75 results in a weakened field on the front side of magnet ring 70 and a strengthened field on the rear side of magnet ring 70. This enables a space-efficient construction of magnet ring 70. The rear side of magnet ring 70, in the completed motor, faces the stator 1 and especially the coils 10 with coil cores 12. The number of poles of magnet ring 70, being sixteen, deviates by one from the number of coils 10 and thus the poles of stator 1, resulting in smooth motor operation.

Figure 12:
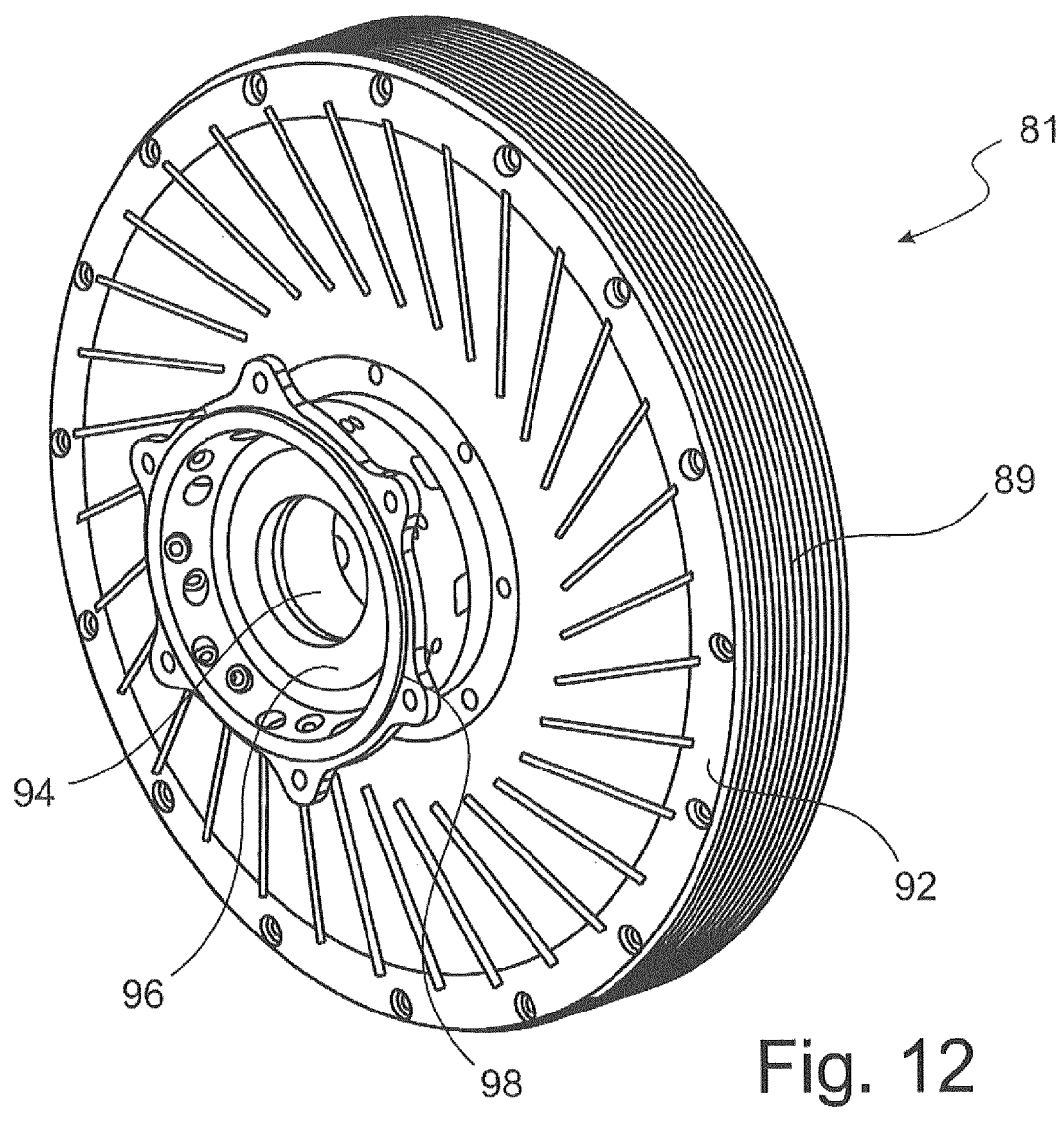
FIG. 12: the rotor of the electric motor in perspective view.
Figure 13:
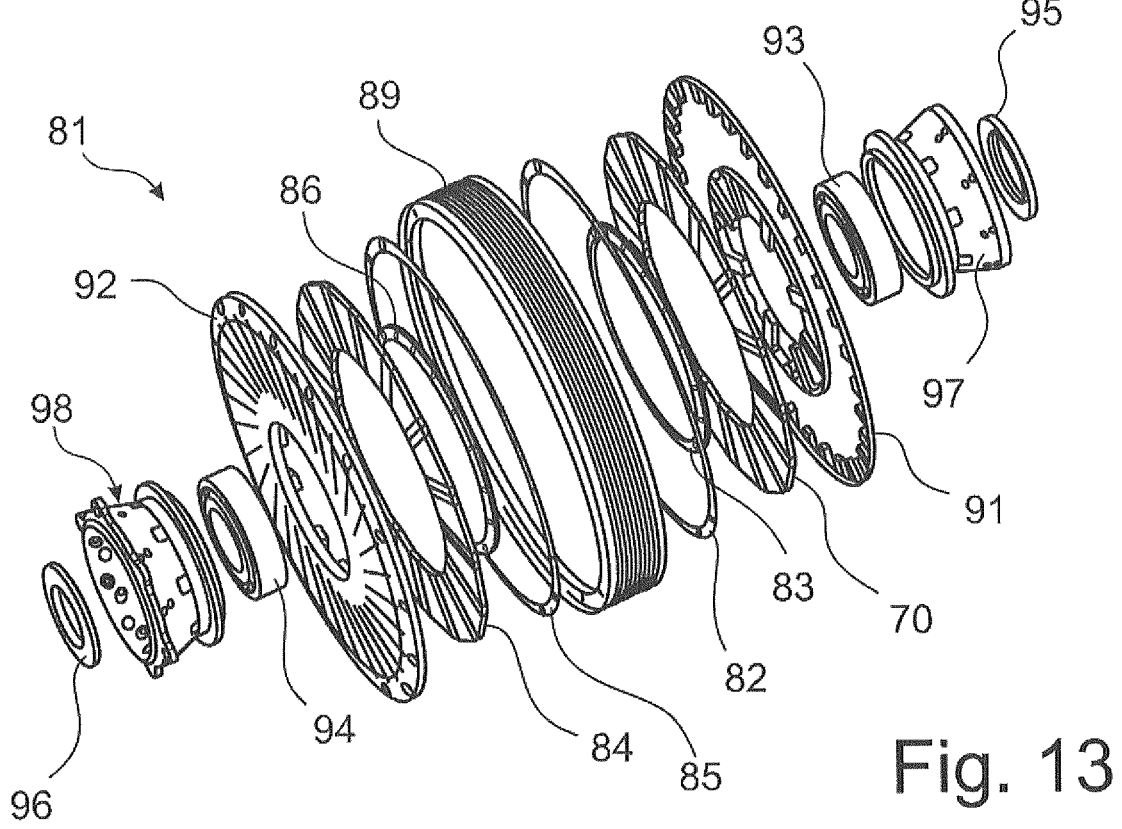
FIG. 13: an exploded view of the rotor according to FIG. 12.

FIGS. 12 and 13 depict the previously mentioned and herein firstly designated rotor 81 in an external view and in an exploded view. The permanent magnets 71 to 75 of the magnet ring 70, which is a left-side magnet ring, are held together by a left-side outer retaining ring 82 and a left-side inner retaining ring 83. Additionally, a right-side magnet ring 84, identical in construction to the left-side magnet ring 70, is provided, with its permanent magnets held together by a right-side outer retaining ring 85 and a right-side inner retaining ring 86. The magnet rings 70 and 84 are oriented with their strengthened field side facing towards the Stator 1 and are rotated relative to each other by one magnetic pole pitch, which here equals 22.5°. This arrangement of the Stator 1 between the magnet rings 70 and 84 results in almost no axial magnetic forces that would pull the rotor 81 off-axis. Axial magnetic forces are also cancelled out by the bilateral and 22.5° rotated arrangement of the magnet rings 70 and 84. This contributes to smooth motor operation even when only two phases of the coils 10 are activated simultaneously.

The magnet rings 70 and 84 are connected a left-side rotor disk 91 and a right-side rotor disk 92 respectively via the retaining rings combined with gluing. The rotor disks with the magnet rings fixed on them are bolted to a rotor sleeve 89 which, in the completed electric motor, radially encloses the cooling body 14 of the stator 1. The Rotor 81 laterally enclosed the cooling body 14 of the stator 1 by the left-side rotor disk 91 and the right-side rotor disk 92. The magnet rings 70 and 84 are each circumferentially and from the axially outward side embedded in the rotor disks 91 or 92 respectively and glued to the rotor disks 91 or 92 as well as axially held in place by the outer retaining ring 82 or 85 and the inner retaining ring 83 or 86. The rotor disks 91 and 92 feature cooling fins for improved heat dissipation to the surroundings. The rotor sleeve 89 also features circumferential cooling fins for heat dissipation. The respective cooling fins result in an increase in the surface area of the rotor sleeve 89 and the rotor disks 91 and 92, thereby enhancing heat dissipation to the surrounding air.

Furthermore, the rotor 81 includes a left-side rotor bearing 93 and a right-side rotor bearing 94 for supporting the Rotor 81 on the shaft 8. A left-side bearing body 97 and a right-side bearing body 98 are provided, projecting axially relative to the Rotor 81. The rotor bearings 93 and 94 are integrated into the bearing bodies 97 and 98 and support the bearing bodies 97 and 98 to which the rest of the rotor assembly is bolted on the shaft 8. The rotor bearings 93 and 94 are sealed by shaft seals 95 and 96 between the bearing bodies 97 and 98 and the shaft 8. The rotor bearings 93 and 94 together with the bearing bodies 97 and 98 also support the rear wheel assembly of a motorcycle driven by the motor as they serve as a mounting point for example for the spokes linking the wheel rim to the rotor. Consequently, the rear wheel of the motorcycle can be directly supported on the bearing bodies 97 and 98, bypassing the rest of the Rotor 81, meaning the rotor disks 91 and 92 and the rotor sleeve 89. As a result the housing of the Rotor 81 with the rotor disks 91 and 92 and sleeve 89 need not withstand significant external loads and can thus be constructed very lightly.

Figure 14:
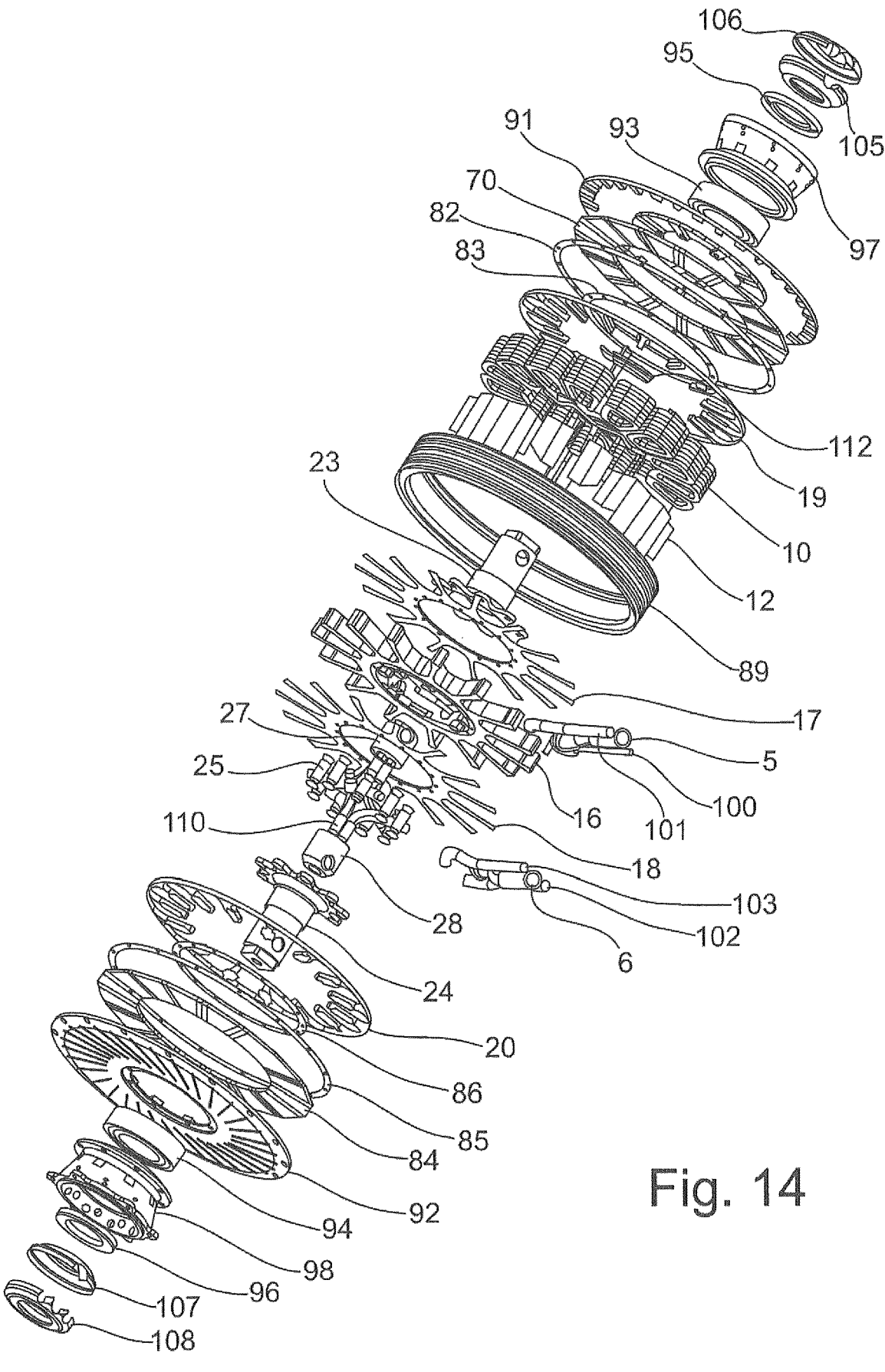
FIG. 14: the electric motor with the parts from FIGS. 1 and 2 and the rotor from FIGS. 12 and 13 in an exploded view.

FIG. 14 shows an exploded view of the electric motor with the Stator 1 and the Rotor 81 as shown in the preceding figures. In addition to the left-side coolant line 5, the sensor line 100 and the first phase line 101 are also led through the left-side shaft half 23. Along with the right-side coolant line 6, the second phase line 102 and the third phase line 103 are led through the right-side shaft half 24. The connection areas in the region of the shaft halves 23 and 24 are protected on the left side between an inner left conductor cap 105 and an outer left conductor cap 106. On the right side, the connection areas are protected between an inner right conductor cap 107 and an outer right conductor cap 108. The electric motor is driven electrically by the phase lines 101, 102, and 103. Each phase line 101, 102, and 103 is connected to the first of five coils 10 connected in series in a clockwise direction (FIGS. 9 and 10). The fifth coils in clockwise direction of each set of coils are connected together. Thus, between two phase lines 101 and 102 or 102 and 103 or 103 and 101, always ten coils 10 are supplied with electrical energy, resulting in ten electrically operated magnets with alternating orientation. The remaining five coils 10 are temporarily inactive.

The coolant lines 31 to 36 (FIG. 4) together form a coolant distributor 110. A sensor carrier 112, on which several position sensors are arranged, is connected to the sensor line 100. The position sensors are connected via the sensor line 100 to the control electronics (not shown) for controlling the electric motor, enabling precise determination of the rotor position and thus precise and efficient motor control. In addition to the position sensors, other sensors may be arranged on the sensor carrier 112, such as a temperature sensor that measures the temperature in the electric motor and also transmits it to the control electronics via the sensor line 100.

Figure 15:
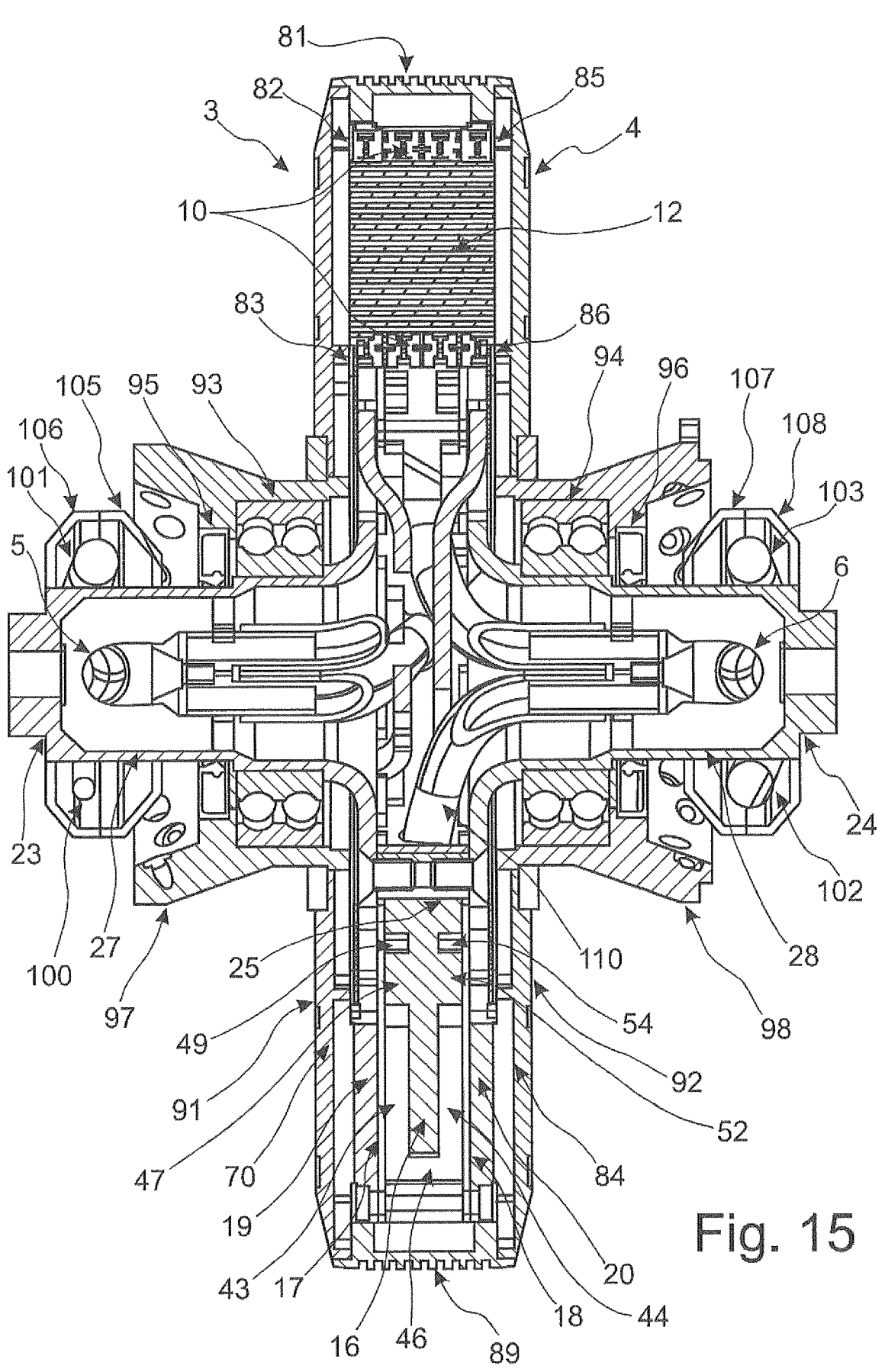
FIG. 15: the electric motor according to FIG. 14 in a sectional view.

FIG. 15 depicts a cross-section of the electric motor according to the previously illustrated and described figures. The rotational axis of the rotor 81 lies within the plane of the section.

Figure 16:
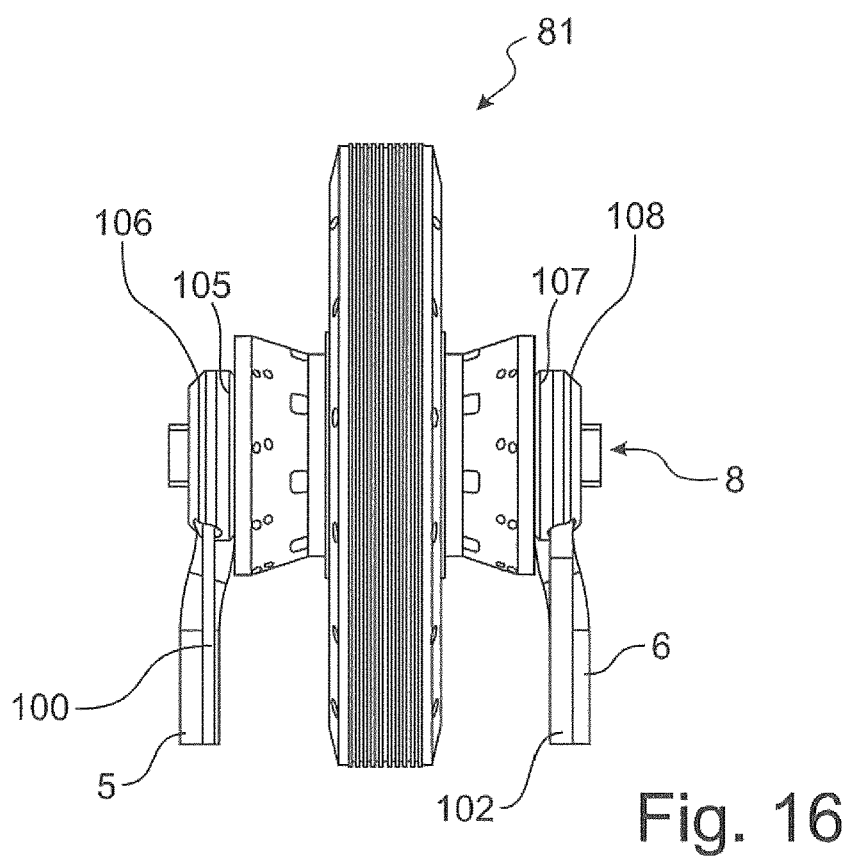
FIG. 16: the electric motor from FIGS. 14 and 15 in a top view.
Figure 17:
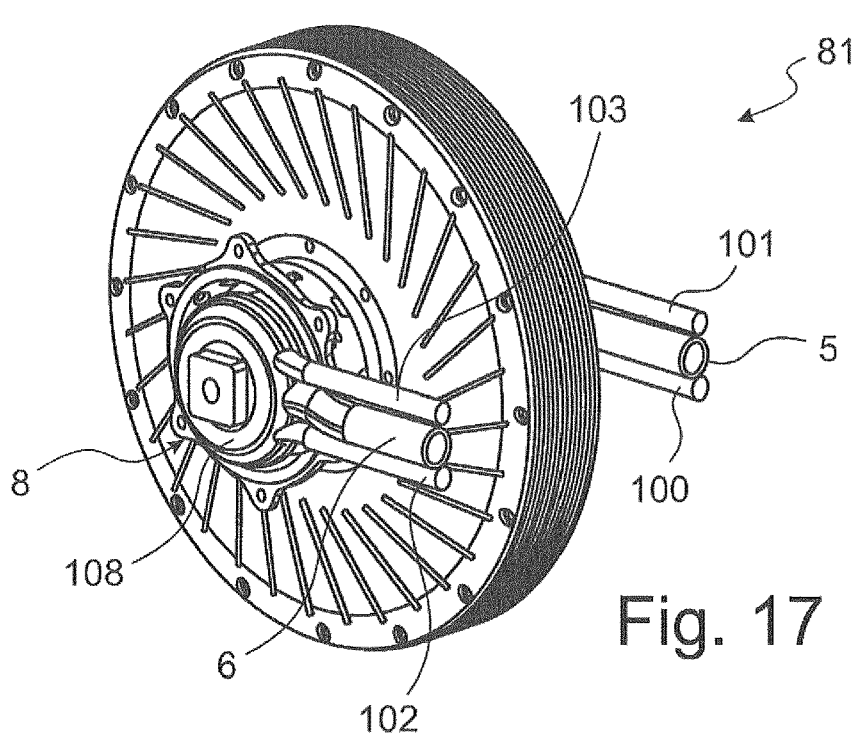
FIG. 17: the electric motor from FIGS. 14 to 16 in perspective view.

FIG. 16 and FIG. 17 show external views of the electric motor. Visible therein are the shaft 8, the rotor 81 rotatably arranged about the shaft 8 as depicted in FIG. 12, and the connections led out from the conductor caps 105 to 108 in the form of the coolant lines 5 and 6, the sensor line 100, and the phase lines 101, 102, and 103.

Figures 18, 19:
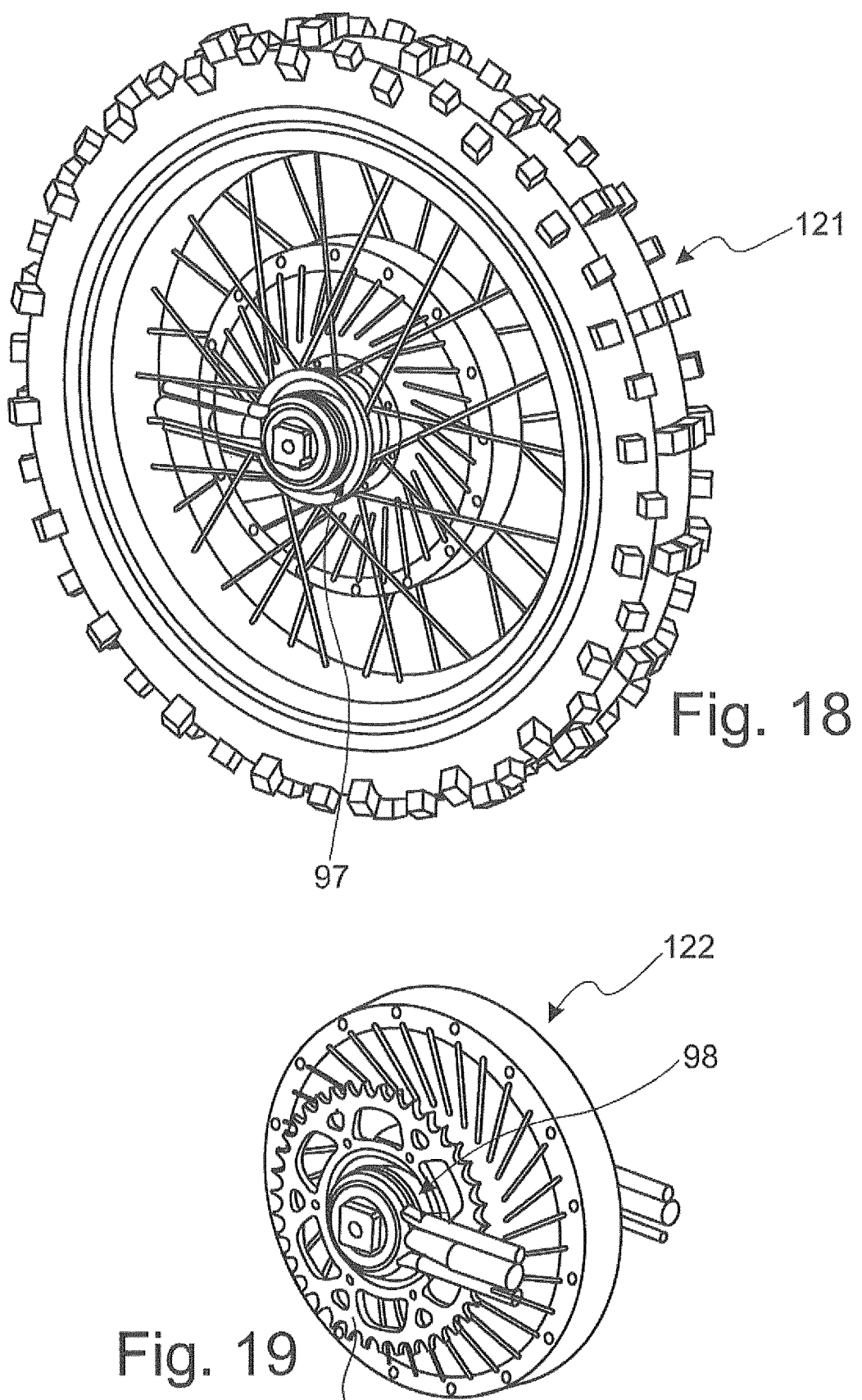
FIG. 18: a hub-drive wheel assembly provided for installation in a motorcycle in the form of a spoked wheel with the electric motor according to FIGS. 14 to 17 in perspective view.
FIG. 19: a chain-drive provided for installation in a motorcycle with the electric motor from FIGS. 14 to 17 in perspective view.
Figure 20:
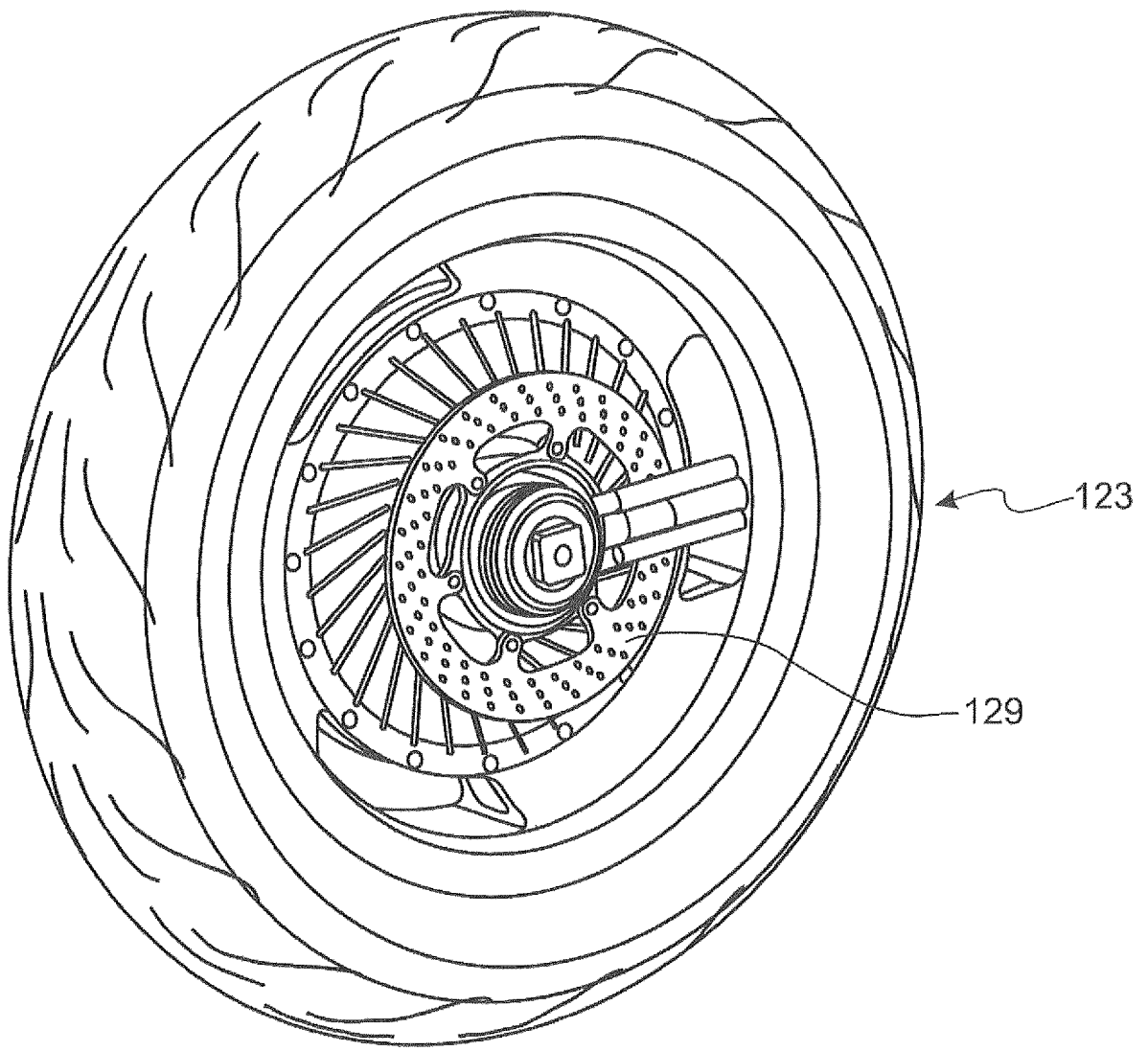
FIG. 20: a hub-drive wheel assembly provided for installation in a motorcycle in the form of a cast wheel with the electric motor from FIGS. 14 to 17 in perspective view.

FIG. 18, FIG. 19, and FIG. 20 illustrate three alternative application examples for the electric motor according. FIG. 18 shows a spoked wheel 121, wherein the bearing bodies 97 and 98 are connected to the rim of a wheel via spokes. The spoked wheel is particularly the rear wheel of a motorcycle.

FIG. 19 depicts a sprocket 126 attached to the right-side bearing body 98 for a chain drive. Instead of the sprocket 126, alternatively, a pulley for driving a belt may be provided, thus a belt drive is produced with the electric motor. These drives enable conventional power transmission from the motor to the rear axle of the motorcycle via a chain or a belt where the electric motor is conventionally integrated into the motorcycle frame, especially between its wheels.

FIG. 20 shows a cast wheel 123 that can be installed on a motorcycle in place of the spoked wheel of FIG. 18. In the cast wheel of FIG. 20, the electric motor is directly inserted into the rim of the cast wheel replacing the rotor sleeve 89 without need for additional spokes. In contrast to the spoked wheel of FIG. 18, the bearing bodies 97 and 98 can be much simpler and lighter here, as there are no holes and seats required for mounting spokes. Additionally, a brake disc 129 is provided here. The brake disc 129 can optionally also be provided additionally on the spoked wheel 121 of FIG. 18.

The invention claimed is:

1. An electric motor, comprising:
   a liquid-cooled stator (1), including
      a plurality of coils (10),
      coil cores (12) inserted into the coils (10), and
      a cooling body (14) accommodating the coils (10) in a form-fitting manner; and
   a rotor (81) having permanent magnets (71, 72, 73, 74, 75) arranged on both sides of the liquid-cooled stator (1), the rotor (81) being of a double-sided axial flux machine design,
   wherein the cooling body (14) includes a cooling core (16) with a plurality of cooling fins (41),
   wherein the coils (10) are arranged between the cooling fins (41),
   wherein radial channels (43, 44) are formed in pairs side by side in the cooling fins (41), the radial channels (43, 44) being connected to each other at radially outer ends of the cooling fins (41) by axial connection channels (46),
   wherein the radial channels (43, 44) at radially inner ends of the cooling fins (41) open into distributor channels (49, 54),
   wherein the distributor channels (49, 54) are formed in a ring shape in the cooling core (16),
   wherein multiple connection channels (57, 58, 59) are formed for each distributor channel (49, 54) in the cooling core (16) to connect the respective distributor channel (49, 54) to coolant lines (5, 6, 31, 32, 33, 34, 35, 36) of a coolant distributor (110),
   wherein the connection channels (57, 58, 59) are equidistantly spaced apart on the respective distributor channel (49, 54) and open into the distributor channels (49, 54), and
   wherein the radial channels (43, 44), the axial connection channels (46), and the distributor channels (49, 54) are integrated as grooves into outside faces (3, 4) of the cooling core (16).

2. The electric motor according to claim 1,
wherein in the cooling core (16) for each of the distributor channels (49, 54) exactly three of the connection channels (57, 58, 59) are formed for connecting a respective distributor channel (49, 54) to coolant lines (5, 6, 31, 32, 33, 34, 35, 36) of a coolant distributor (110).

3. The electric motor according to claim 1,
wherein the connection channels (57, 58, 59) are spaced apart from each other at an angle of 120° on the distributor channels (49, 54) and open into the distributor channels (49, 54).

4. The electric motor according to claim 1,
wherein the cooling core (16) has an inlet side and an outlet side next to each other in an axial direction,
wherein the radial channels (43, 44) comprise
a left-side radial channel (43) arranged on a left side (3) and
a right-side radial channel (44) arranged on a right side (4), and
wherein the axial connection channels (46) are formed at the radially outer ends of the cooling fins (41) through which the left-side radial channels (43) and the right-side radial channels (44) are connected to each other in pairs.

5. The electric motor according to claim 1,
wherein the cooling core (16) in an axial direction has an inlet side and an outlet side next to each other,
wherein the distributor channels (49, 54) are formed side by side in the axial direction in the cooling core (16),
wherein the distributor channels (49, 54) comprise a left-side distributor channel (49) arranged on a left side (3) and a right-side distributor channel (54) arranged on a right side (4).

6. The electric motor according to claim 1,
wherein the cooling core (16) has a flow divider (47, 52) in front of each of the radial channels (43, 44) at a mouth of the radial channels (43, 44) into the respective distributor channel (49, 54).

7. The electric motor according to claim 1,
wherein the coil cores (12) each consist of a bundle of electrically insulated wire segments arranged parallelly with a shaft (8) of the motor.

8. The electric motor according to claim 1,
wherein the permanent magnets (71, 72, 73, 74, 75) are arranged in form of a Halbach array into magnet rings (70, 84),
wherein a magnetic flux density of the magnet rings (70, 84) on their side facing the coils (10) of the liquid-cooled stator (1) is greater than on their side facing away from the coils (10).

9. The electric motor according to claim 1,
wherein the electric motor has axially protruding bearing bodies (97, 98) relative to the rotor (81) for supporting a wheel on its shaft (8) bypassing the rotor (81), wherein rotor bearings (93, 94) are accommodated in the bearing bodies (97, 98), the bearing bodies (97, 98) are mounted on the shaft (8) by the rotor bearings (93, 94), and
wherein the rotor (81) is bolted to and supported on the shaft (8) by the bearing bodies (97, 98) and the rotor bearings (93, 94).

10. A wheel hub for a motorcycle comprising the electric motor according to claim 1.

11. A motorcycle, comprising
the electric motor according to claim 1 installed in a rear wheel hub.

12. The electric motor according to claim 1,
wherein the cooling body (14) is formed in multiple parts, the cooling body (14) having two cooling core covers (17, 18) which are positioned on axially outward sides of the cooling core (16), and
wherein the distributor channels (49, 54) and the radial channels (43, 44) are grooves integrated into the cooling core (16) from axially outward sides of the cooling core (16) and covered by the cooling core covers (17, 18).

13. The electric motor according to claim 1,
wherein the electric motor has a two-part shaft (8) with shaft halves (23, 24) including a left-side shaft half (23) and a right-side shaft half (24), and
wherein the left-side shaft half (23) is connected to the right-side shaft half (24) at a distance by shaft connectors (25).

14. The electric motor according to claim 13,
wherein the shaft halves (23, 24) have hollow bodies,
wherein the electric motor comprises a left-side shaft insert (27) inserted into the left-side shaft half (23) for axial passage of coolant through the left-side shaft half (23), and
wherein a right-side shaft insert (28) is inserted into the right-side shaft half (24) for passage of coolant through the right-side shaft half (24).

15. The electric motor according to claim 13,
wherein the shaft halves (23, 24) each have at least one cylindrical main section and an end section for connection to the shaft connectors (25),
wherein the end section is radially enlarged compared to the cylindrical main section, and
wherein the shaft connectors (25) are spaced apart parallel to each other and spaced apart from each other.

16. The electric motor according to claim 12,
wherein the cooling body (14) has
retaining rings (19, 20) enclosing windings of the coils (10) outwardly and
cooling fingers provided with retaining tabs (21).

17. The electric motor according to claim 16,
wherein the retaining rings (19, 20) are electrically insulated towards the cooling core covers (17, 18).

* * * * *